May 13, 1924.
J. A. BOWDEN
1,493,597
MEANS FOR LUBRICATING LAMINATED SPRINGS
Filed Oct. 21, 1922
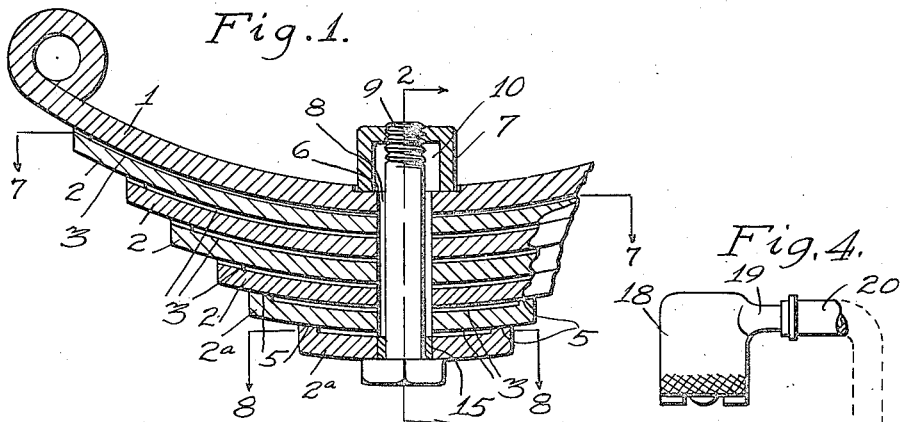
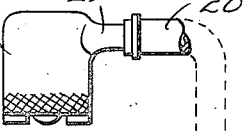
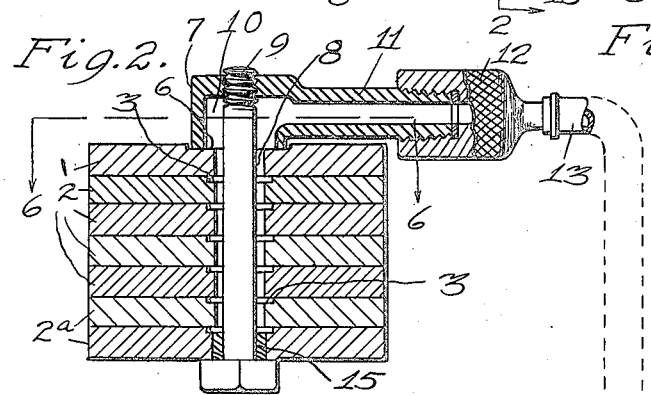
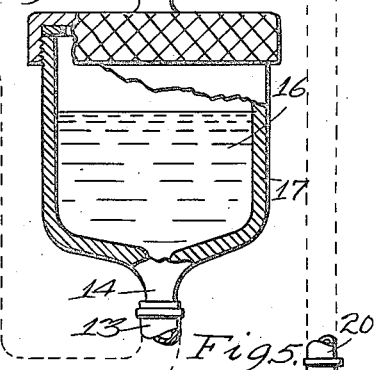
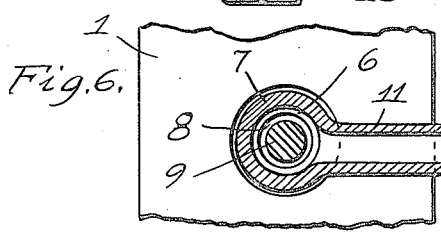
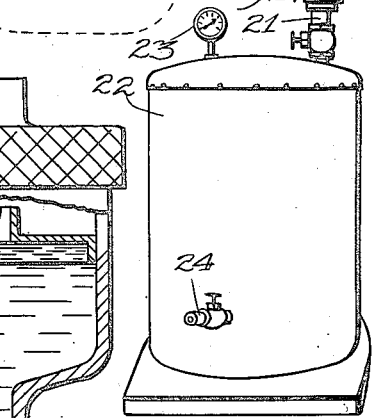
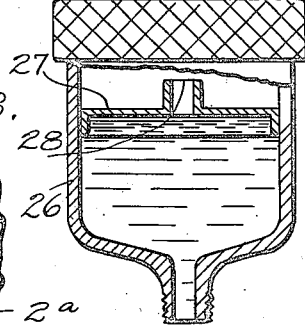
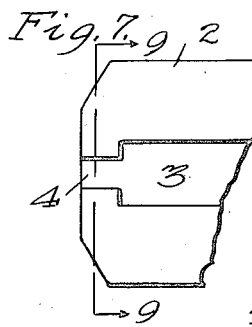
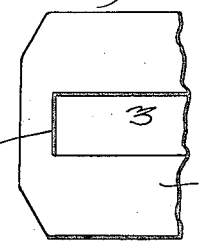
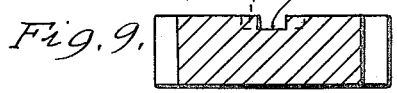
Inventor
By Junius A. Bowden
Attorney Patented May 13, 1924.

1,493,597

UNITED STATES PATENT OFFICE.

JUNIUS A. BOWDEN, OF LOS ANGELES, CALIFORNIA.

MEANS FOR LUBRICATING LAMINATED SPRINGS.

Application filed October 21, 1922. Serial No. 596,126.

*To all whom it may concern:*

Be it known that I, JUNIUS A. BOWDEN, a citizen of the United States, residing at Los Angeles, in the county of Los Angeles, State of California, have invented new and useful Improvements in Means for Lubricating Laminated Springs, of which the following is a specification.

This invention relates to lubricating leaves in laminated springs, leaves that are formed with grooves, or where inserts are placed between the leaves to form grooves and where the lubricant is injected or forced into the grooves.

The main object of the invention is to provide simple, inexpensive and quick acting means, which includes compressed air combined with a lubricant and a closed receptacle, whereby the first two elements commingle and result in sputtering or spreading of the lubricant when liberated or discharged into confined grooves between leaves.

Another object of the invention is to provide means consisting of a closed receptacle that is adaptable for causing a secondary action of the air upon the lubricant, after the lubricant has been discharged from the receptacle into the grooves.

An important feature of the invention is to provide an air vent at the outer end of some of the grooves, between the leaves, adapted to equalize resistance during the process of lubrication.

Another feature of the invention is to provide means mounted upon the central bolt, the latter for binding the leaves together, the means to include a hollow intake lubricating head adapted to provide a passageway surrounding the bolt for the lubricant and compressed air to pass into the grooves.

Other features of the invention will be brought out in the specifications and claims.

Fig. 1 is a side elevation, partially in section, of a reduced length of a laminated spring, showing grooves between the leaves and other portions of my inventions. Fig. 2 shows a vertical section through Fig. 1, along the line 2—2 also shows connecting means for supply and intake-head in section, to a lubricant supply receptacle Fig. 3. Fig. 3 shows a closed receptacle, partially in section, for dispensing of a lubricant combined with compressed air. Fig. 4 indicates an air-valve and tube connection for supplying compressed air from reservoir, Fig. 5, to a closed receptacle. Fig. 5 shows a reservoir for compressed air. Fig. 6 is a plan view showing the top or master leaf of Fig. 2, and plan view of intake-head along the line 6—6 of Fig. 2. Fig. 7 is a plan view of one end of the first leaf joining the master leaf, shown in Fig. 1 through line 7—7 of Fig. 1. Fig. 8 is a plan view of one end of the shortest or bottom leaf shown in Fig. 1 along the line 8—8 of Fig. 1 which shows the groove closed at the outer ends. Fig. 9 is an enlarged cross section of Fig. 7 through line 9—9 of Fig. 7, which shows an air vent leading outwardly from the main groove, the latter indicated by the dotted lines. Fig. 10 is a modified form of a closed receptacle that may be used in place of the closed receptacle as of Fig. 3.

Referring to the numerals of the drawings, Fig. 1 shows a laminated spring having a master leaf 1 and six other leaves, four of which, 2, are provided with a groove 3 also provided with an air vent 4, 2 leaves, 2ª, are provided with a groove 3, their outer ends 5 are closed as shown in Figs. 1 and 8. The master leaf 1 has a recess 6, approximately central between the ends and widths of the leaves, shown in Figs. 1 and 6. The recess 6, is intended for intake-head 7 to seat itself and be held thereto from displacement, it is located over the passageway 8 and centrally with bolt 9. The interior 10 of the intake-head surrounding the bolt, is enlarged to provide ample room, more than equal to the total passageway between the bolt and wall forming the passageway 8, which leads to the grooves 3 between the leaves. The intake-head 7 is provided with a nipple 11 and a flexible tube 13. The other end of the tube 13 is connected to the outlet 14 of the receptacle 17. The bolt 9 is of the ordinary standard type and is somewhat smaller than the aperture forming the passageway 8 as shown in Figs. 1, 2 and 6. As the head of the bolt, is a bushing 15, this bushing acts as a guide to hold the bolt 9 central with the apertures in the leaves to provide a uniform width passageway 8.

The leaves of the spring are bolted together as shown, but will be further secured and held in alignment by means of ordinary spring clips (not shown) which are commonly used to secure the springs to an axle of a vehicle. To provide grooves in old leaves that have been hard tempered, the grooves may be ground in or a slotted insert, not shown, may be placed between the leaves to form grooves such as shown in my former application, Serial Number 534,494. In the manufacture of new leaves, I would preferably have the grooves rolled in.

The closed receptacle 17, is for a lubricant and compressed air, oil supply, indicated 16, is preferable to use in the receptacle, as it combines better with air than grease and can be held partially in suspension with high pressure air, while in transit during the process of lubrication and on account of the comparatively light weight of the mixture, to that of oil or grease alone and the high velocity of compressed air when liberated, the result is spontaneous and perfect in effect for driving the oil, which will penetrate to the innermost parts and is carried to the longest distances. Fig. 4 indicates an automatic operating air valve 18 and a nipple inlet 19 to which a flexible tube 20 is secured, the other end of the tube 20 is connected with an outlet 21 of a compressed air tank 22 of Fig. 5. A pressure gauge 23 is connected with the air tank 22 and the tank has an inlet 24 which is intended for a connection to an air compressor, not shown.

In the operation of lubricating spring leaves, the closed receptacle 17 is supplied with enough oil for one lubrication of one set of springs. The fitting 12 with the tube 13 attached as shown in Fig. 2 is secured to the nipple 11 of the intake-head 7, the air valve 18 is pressed upon the end of nipple 25 of the receptacle 17, this automatically opens the valve which supplies compressed air through tube 20 from tank 22 and by holding the valve in that position a few seconds upon the nipple 25, the air rushes into the receptacle and commingles with the oil and causes an instantaneous commotion and in a few seconds drives the resultant mixture out of the receptacle into the grooves between the leaves and if the valve is held longer than is necessary for the air to drive the lubricant out of the receptacle, the air will continue and cause a secondary action upon the oil deposited in the first operation. I am aware that it is not new in laminated springs to form grooves of different kinds in leaves or to provide grooves or slots in inserts and place them between leaves to provide a passageway between the leaves as means for conveying a lubricant to the face of the leaves. In the manufacture and tempering of spring leaves, it has been found practically impossible to maintain uniformity in contours of different length leaves; this is due to heat in tempering, furthermore scale forms from heating and the surface is left with depressions; for these reasons it is impossible to place numerous spring tempered leaves together face to face and bolt them together without leaving more space between the leaves, at some points than at others. To force lubricants through grooves between leaves to the ends in long leaves, by use of a grease gun is not practical. In considering this matter carefully, it is plain to understand why lubricants cannot be forced with a grease gun through a long narrow and very shallow passageway to the ends of the leaves. This, however may be done in some of the very short leaves. There are numerous reasons why the lubricant cannot be pushed through these narrow and shallow grooves between leaves with a grease gun. One reason is, lubricant alone is too heavy and builds up, another reason, too much resistance or friction in forcing it such a great distance, partially on account of closed end grooves.

In grooves or slots heretofore provided between spring leaves the grooves or slots were closed at their outer ends and when trying to drive the lubricant through the narrow passageway as by slowly forcing it with a grease gun, the passageway would clog; partially on account of the resistance of a cushion of air accumulating as the lubricant advanced toward the outer end of the leaves, this resulted in the lubricant going to parts of least resistance as by passing out at the sides between the leaves at places where the face of the leaves do not join closely together.

With my improved means of lubricating laminated springs, of the type referred to, I combine in a closed receptacle a lubricant with high pressure compressed air. The fitting on the receptacle has an inlet the end of which, is formed substantially the same as the end of a universally used tire inflating valve, thus making it adaptable for connection to compressed air at gasoline stations, where tires are inflated, at these places the air pressure will exceed 100 pounds to the square inch. The receptacle is supplied with just enough lubricant for proper lubrication of one laminated spring, for reasons that will be made clear in the following explanation, and when a connection is made from the outlet of the receptacle to means of communication with grooves between the leaves and following this with air connection to the air inlet fitting on the receptacle, the process of lubrication will take place, which may be explained as follows: a commingling of the lubricant, (preferably oil), and compressed air causing the air and oil to intermingle and the high pressure air will drive the mixture into the grooves, automatically resulting in a rapid sputtering and spreading of the lubricant, at more or less short intervals, on account of the lubricant being combined with air, and confined in a very close passageway, clogging of the lubricant will intermittently take place, but this clogging is almost immediately overcome by the liberation of high pressure air at each interval of clogging and thus result in intermittent blasts of air, causing a sputtering and spreading of the lubricant, liken to rapid firing or explosions, finally when all the lubricant is discharged from the receptacle, a secondary action of the air upon the lubricant, in the grooves, takes place and drives the lubricant to a further distance. The air vent at the end of the longer leaves equalizes the resistance through the long grooves and provides for uniform delivery of the lubricant to all the faces of the leaves. The object of supplying only enough lubricant for one set of springs, is to get the benefit of this double action of the air, for unless all the lubricant was discharged from the receptacle there would be no secondary action.

At long intervals between lubricating the springs, the grooves may become partially clogged for different reasons, in this case, the air could first pass through the receptacle into the grooves and clear them out before lubricating again. The old slow plan of manual labor in manipulating a grease gun to force grease through long grooves between leaves which permits the grease to build up and clog and go out the side of the leaves where there is less resistance, results in portions of the long leaves not being lubricated. The reason why my improved plan will accomplish what cannot be done with a grease gun is owing to the fact that the lubricant is combined with compressed air at a high pressure and the result is liken to an explosion and drives the lubricant forward with great rapidity to a great distance before it has time to pass out at sides of leaves or uneven places between the leaves. I have found these things out by practical tests with both systems and know my improvement is a success, and that the old plan of using a grease gun is a failure, for the purpose of lubricating laminated springs through conduits or grooves.

The grooves are very narrow and shallow, less than $\frac{1}{32}$nd of an inch in depth, and the passageway formed around the central bolt, through the hole in the leaves and through which the lubricant is supplied by my improvement, is less than $\frac{1}{32}$nd of an inch, so it is plain to understand why it is necessary to provide such a combination as high pressure air with a lubricant to lubricate the full length of long leaves through such restricted passageways and to vent the ends of the long passageway.

The strength of the leaves must not be too much impaired to provide for larger passageways, neither must the leaves be made too heavy to provide for large passageways, as in the latter case their resilience would be affected. The central hole now provided in the leaves, through which a bolt assists in holding the leaves together, should not be enlarged because this central point in the leaves, is their weakest part, therefore very narrow limits in providing a passageway for lubricating the face of the leaves had to be worked out and the only way to meet the condition was by the use of compressed air combined with a lubricant and means for supplying this combination.

In the modified form, as of Fig. 10, the air will pass through opening 28 of the piston like part 27 and commingle with lubricant indicated by lines below part 27 and effect a result substantially as in the preferred form.

What I claim is—

1. Means of lubricating leaves in vehicle springs provided with a groove between the leaves, comprising a source of continuous supply of compressed air and a receptacle in which the air and lubricant commingle, said air having constant pressure adapted to rapidly force the lubricant continuously to the end of the groove, means adapted for connecting said receptacle to means associated with said groove.

2. Means of lubricating leaves in vehicle springs having an aperture in the leaves, comprising means of an open circuit between the leaves connecting with said aperture, a source of compressed air and a lubricant receptacle in which the air and lubricant commingle, said source adapted to furnish a continuous uninterrupted supply of compressed air adapted to cause a rapid commotion and mixture of the air and lubricant, means adapted for connecting said receptacle to the aperture in said leaves.

3. Means of lubricating leaves in vehicle springs, a groove between some of the leaves, comprising a tank of compressed air and a lubricant receptacle in which the air and lubricant commingle adapted to cause a rapid commotion and mixture, means of connection from said receptacle to intake means associated with said groove.

4. Means of lubricating leaves in vehicle springs provided with a groove between some of the leaves, comprising a source of compressed air adapted to furnish a continuous supply and a lubricant receptacle in which the air and lubricant commingle adapted to cause rapid commotion and mixture, said receptacle having an air inlet nipple, its outer end formed to register with air valve means, said valve means adapted for detachable engagement with the end of said nipple, said valve means being secured to a flexible tube and connected with said compressed air, the receptacle having a discharge outlet and a connection from said outlet to intake means associated with said groove substantially as described.

5. In lubricating laminated spring leaves of a vehicle, a longitudinal groove between some of the leaves, a receptacle in which a lubricant with compressed air are commingled and means adapted for connection from said receptacle to intake means associated with said groove, said air being supplied from a tank adapted to furnish a continuous supply and cause rapid expansion when liberated into said groove and force the lubricant to the end of said groove.

6. In lubricating laminated spring leaves of a vehicle, a groove between some of the leaves, means adapted for commingling a lubricant with compressed air, whereby a commotion and mixture is set up between the air and lubricant, said means comprising a receptacle having an air inlet nipple, the outer end of the nipple being formed to register in substantially air tight engagement with air valve means associated with said compressed air when said valve means is pressed upon said end of the nipple, means for supplying the receptacle with a lubricant, means of an outlet connection from said receptacle to means of an intake associated with said groove.

7. In lubricating laminated springs having numerous leaves provided with a groove between some of the leaves forming an open circuit, comprising a closed receptacle having an air inlet nipple, said nipple adapted for detachable engagement with highly compressed air means, said receptacle having openable means adapted for a lubricant supply and having a discharge outlet adapted for connection to intake means associated with said groove, for the purpose described.

8. In combination with laminated springs having numerous leaves provided with a groove between some of the leaves, a closed tank adapted to contain high pressure compressed air, a receptacle adapted to contain a lubricant, said receptacle having an air inlet nipple, a flexible tube connection to said tank and the tube connected to an air valve, the air valve adapted for detachable engagement with the outer end of said nipple for supplying air when pressed upon the end of the nipple, said receptacle having an outlet adapted to connect with intake means associated with said groove, for the purpose described.

9. In combination with lubricating laminated spring leaves of a vehicle, comprising a source of highly compressed air, a lubricant receptacle in which the air and lubricant commingle and result in a commotion and mixture of the air and lubricant, said receptacle having an air inlet nipple and a discharge outlet, a tube connection to said compressed air, valved means secured to said tube, said valved means adapted for detachable engagement with said nipple, said leaves having an aperture through each leaf, an open circuit between the leaves intersecting with said apertures, the apertures adapted to register in alignment, an intake head adapted to be secured upon one of the outer leaves and in alignment with the apertures, means of connection to said discharge outlet adapted to connect with the intake head.

10. In lubricating laminated spring leaves, a groove between some of the leaves provided with an open circuit, means adapted for commingling a lubricant with compressed air, means of said air adapted to give a continuous supply, a receptacle provided with an air inlet nipple, the outer end of the nipple being formed to register with air valve means and adaptable for detachable engagement therewith, said valve means adapted to supply said compressed air, outlet means from said receptacle to intake means associated with said groove, said air having a pressure greatly in excess of atmospheric pressure whereby when liberated into the groove will greatly expand and force the lubricant, substantially as described.

11. In laminated vehicle springs comprising numerous leaves having an aperture in registering alignment through the leaves, said aperture adapted to receive a bolt adapted to bind the leaves together, a lubricant intake head having a threaded opening in its outer end and a lateral extending nipple adapted to receive commingled air and oil under pressure, said intake head adapted to be secured in position in registering alignment with said aperture by means of said bolt, whereby the bolt may be inserted through the aperture in the different leaves and screwed into the threaded opening provided in the end of the intake head and bind the intake head and leaves together, substantially as shown.

12. In lubricating vehicle springs comprising numerous leaves, an aperture through the leaves, a groove between some of the leaves, said aperture and groove adapted to form an open air circuit, said aperture provided with means of an adaptable connection, through which oil and air may be forced into the circuit.

13. Means of lubricating leaves in vehicle springs comprising numerous leaves, an aperture through the leaves, a groove between some of the leaves, said aperture and groove adapted to form an open circuit, said aperture provided with means of an adaptable connection through which a mixture of a lubricant and air may be forced adapted to result in the air sputtering and spreading the lubricant between the leaves.

14. In lubricating vehicle springs comprising numerous leaves provided with a groove between the leaves and an aperture through the leaves intersecting with the groove, means comprising a source of compressed air adapted to give a constant supply, a small receptacle in which a measured quantity of lubricant is supplied and means of connection from said air to said receptacle, said last means adapted to open and supply air to the receptacle when pressed upon an inlet nipple of the receptacle and cause a commotion and mixture of the air and lubricant, means of connection from the receptacle to said aperture.

In testimony whereof, I have hereunto set my hand, at Los Angeles, California, this 16th day of October, 1922.

JUNIUS A. BOWDEN.